(12) United States Patent
Paganelli

(10) Patent No.: US 9,180,551 B2
(45) Date of Patent: Nov. 10, 2015

(54) DUAL LASER HEAD

(71) Applicant: AGIE CHARMILLES NEW TECHNOLOGIES SA, Meyrin (CH)

(72) Inventor: Dino Cataldo Paganelli, Saint Alban de Montbel (FR)

(73) Assignee: AGIE CHARMILLES NEW TECHNOLOGIES SA, Meyrin (CH)

( * ) Notice: Subject to any disclaimer, the term of this patent is extended or adjusted under 35 U.S.C. 154(b) by 342 days.

(21) Appl. No.: 13/904,617

(22) Filed: May 29, 2013

(65) Prior Publication Data

US 2013/0319981 A1 Dec. 5, 2013

(30) Foreign Application Priority Data

May 31, 2012 (EP) .................................... 12170208

(51) Int. Cl.
*B23K 26/36* (2014.01)
*B23K 26/20* (2014.01)
*B23K 37/02* (2006.01)
*B23K 26/03* (2006.01)
*B23K 26/06* (2014.01)
*B23K 26/08* (2014.01)
*B23K 26/14* (2014.01)
*B23K 26/38* (2014.01)
*B23K 26/40* (2014.01)

(52) U.S. Cl.
CPC .............. *B23K 26/20* (2013.01); *B23K 26/032* (2013.01); *B23K 26/034* (2013.01); *B23K 26/0604* (2013.01); *B23K 26/0884* (2013.01); *B23K 26/1405* (2013.01); *B23K 26/36* (2013.01); *B23K 26/362* (2013.01); *B23K 26/365* (2013.01); *B23K 26/381* (2013.01); *B23K 26/4065* (2013.01); *B23K 26/4075* (2013.01); *B23K 37/0235* (2013.01)

(58) Field of Classification Search
CPC ..................... B23K 26/00; B23K 26/20–26/42
USPC ......................................... 219/121.76, 121.83
See application file for complete search history.

(56) References Cited

U.S. PATENT DOCUMENTS

| 5,239,160 | A | * | 8/1993 | Sakura et al. | ............ 219/121.82 |
| 5,779,696 | A | * | 7/1998 | Berry et al. | ..................... 606/16 |
| 2005/0205778 | A1 | | 9/2005 | Kitai et al. | |
| 2006/0113375 | A1 | | 6/2006 | Caiger | |
| 2009/0191481 | A1 | * | 7/2009 | Tashiro et al. | ................ 430/306 |
| 2009/0206065 | A1 | | 8/2009 | Kruth et al. | |
| 2010/0044356 | A1 | * | 2/2010 | Cope | ........................ 219/121.67 |
| 2011/0120981 | A1 | | 5/2011 | Paganelli | |
| 2011/0204045 | A1 | | 8/2011 | Moffatt | |

FOREIGN PATENT DOCUMENTS

| DE | 102009037979 A1 | 2/2011 |
| EP | 2301706 A2 | 3/2011 |

* cited by examiner

*Primary Examiner* — Samuel M Heinrich
(74) *Attorney, Agent, or Firm* — Bachman & LaPointe, P.C.

(57) ABSTRACT

A laser machine tool for the machining of workpieces by laser ablation comprising a moveable dual laser head (4). The laser machine tool has a dual laser head (4) intended for the emission of laser beams, whereby the laser head (4) incorporates in its housing two or more laser sources (8), each laser source emitting a different type of laser beams and whereby the two or more laser sources (8) incorporated in the laser head (4) cannot operate simultaneously for the machining of the workpiece.

11 Claims, 5 Drawing Sheets

DUAL LASER HEAD

BACKGROUND OF THE INVENTION

The present invention relates to a laser machine tool and laser heads for the machining of workpieces by laser ablation.

Laser machine tools for machining workpieces by laser ablation are generally known. The European patent application EP 2 301 706 A2 describes for instance a possible technical design for such an apparatus.

An imaginable configuration and design for such a known laser machine tool for machining workpieces by laser ablation is shown in FIG. 1. The laser head 1 of the displayed machine operates with 5 mechanical axes and allows the positioning of the laser focal point and the direction of the emitted laser beam on the surface of a three-dimensional solid workpieces situated within the machine (not shown). Several machine configurations are imaginable: For instance a workpiece-holder or—as shown in FIG. 1—a laser head which is linear movable in three axis (Cartesian X, Y, Z system). Preferably, allowing a higher accuracy and flexibility, the workpiece-holder or the laser head are in addition able to rotate with high precision on two rotational axes.

There is a growing demand for using the laser machining process on increasingly large workpieces (e.g. for the production of moulds for the manufacturing of dashboards or bumpers of cars and trucks). This made it necessary to design new laser machine tools of large dimensions.

Today there is also a demand in the aviation industry for turbine drilling applications with engraving of the port exhaust to optimize the vortices. Those applications require first the drilling under a drilling laser head and the subsequent laser engraving under a suitable laser engraving head. Due to very different required machine characteristics, it is not possible to accomplish both machining steps with the same laser head. So far, the laser drilling and the following laser engraving have always been conducted on separate laser machines tools by moving the workpiece first under the drilling laser head and subsequently to the next machine under its laser engraving head.

This practice is possible for smaller workpieces, which can be easily moved for instance pre-mounted on clamping devices from machine to machine. For bigger, bulky and heavier workpieces however, this practice gets laborious and might in addition negatively affect the manufacturing accuracy due to a the bigger risks of misalignment in view of the size of the workpieces to be machined.

Apart of this, two laser machine tools are necessary for the manufacturing, increasing therewith the necessary investments for the production line and, of course, the manufacturing costs.

The present invention aims therefore to solve this problem.

SUMMARY OF THE INVENTION

The object of this invention is achieved by providing a laser machine tool for the machining of workpieces by laser ablation with a moveable laser head.

DETAILED DESCRIPTION

Figure 1:
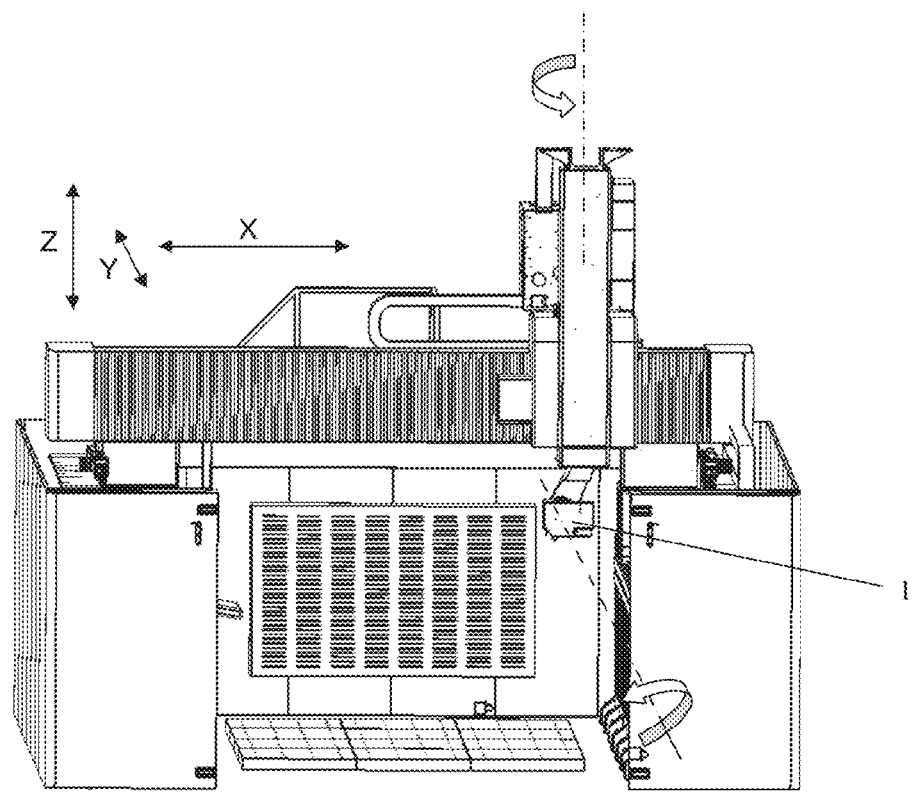
FIG. 1 illustrates a laser machine tool having a laser head known in the prior art.

In accordance with the present invention, a moveable laser head incorporating in its housing two laser sources each emitting a different, dedicated type of laser beams. The two laser beams have preferably the same input optical axis (collinear). The used galvanometer module contains 2 mirrors rotating with 2 servomotors (galvanometers). The galvanometer is able to move the laser beam very fast in 2 directions. This permits to cover a surface on the workpiece which is proportional to the F-Theta lens used. With the inventive dual laser head it is possible to accomplish resp. to combine the above-mentioned two machining steps of drilling and engraving in one single 5 axis laser machine tool.

Thanks to the inventive dual laser head, even bulky workpiece have to be clamped and positioned only once in the laser machine tool. The moveable dual laser head just moves around the workpiece and accomplish the necessary machining steps without the need to move or to reposition the clamped bulky workpiece.

The laser machining according to the invention requires the use of just one galvanometric head to move the laser beam resp. laser spot over the workpiece surface. This allows to perform a percussion drilling, in circular trepanning or in spiral trepanning. The dual laser head also allows, in the case of percussion drilling, to rotate the beam with a very small diameter, close to 0, which improves the edge and geometry of the produced hole.

The 5 axis laser machine tool is preferably designed in the gantry type, with a moveable laser head on three linear axes plus two rotary axes.

Outside the aviation industry, other applications for the dual laser head are thinkable, such as for the drilling and engraving of moulds for glass, tires, thermoforming moulds, etc.

The demand for multi-source laser machining tools operating on a same optical axis makes it necessary to be able to automatically adjust the optics or nozzles for different applications.

Designing a moveable laser head according to the present invention, offers particularly the following advantages:

- The dual laser head moveable on 5 axis allows a high-precision positioning of the laser tool, because it is the working head which rotates around the workpiece, while the workpiece remains fixed on the table. If the workpieces were to be moved, the precision would necessarily be lower given the weight and size of bulky workpieces. The invention allows the machining of heavy and large workpieces (e.g. moulds of 18'000 kg and 4000× 3000×1500 mm size).
- A higher flexibility, since the inventive dual laser head offers the option to use either one or the other laser source depending on the application. The two lasers can however never operate simultaneously.
- An optional camera offers in addition the possibility to see the working area within the machine, eventually via an infrared/visible beam splitter. An optional camera offers also the possibility of performing some calibration and gauge tasks by keeping the machine door closed. An LCD shutter allows synchronising laser shots with the image display, analysis of plasma stain etc. It is also possible to install a thermal camera when using a laser for local heat treatment or a diode sensor for gauging the reflected laser power that returns to the laser.

Further, all laser optical elements, camera and optical components move with precision at the same time with the galvanometric head and are mounted in the same rigid housing of the laser head. There are therefore no possible misalignments between all these elements.

The necessary cables pass inside the axes of the rotation motors. Guides allow recentring the cables to the neutral axis in the rotor to prevent rubbing and twisting. It also avoids parasitic torques on the axes that may cause machining imprecisions.

Suction nozzles can be placed around the dual laser head, allowing to collect fumes and dust and discharged by a dedicated vacuum cleaner.

Preferably a process monitoring camera (IP type) is also installed, equipped with lighting, monitors the proper functioning of the machine (e.g. remotely via the Internet).

Optionally, a camera positioned on the side of the head allows calibrating or positioning the machine with precision on a point of the workpiece.

Optionally, a retractable 3D touch probe allows to locate with precision the work piece in 3D.

Further, a photo sensor optionally installed allows measuring the power return of the laser source in use.

Figure 2:
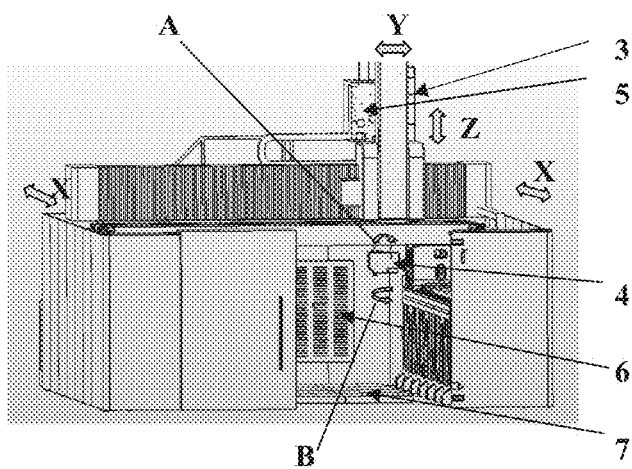
FIGS. 2 and 3 illustrate a laser machine tool in accordance with the present invention.
Figure 3:
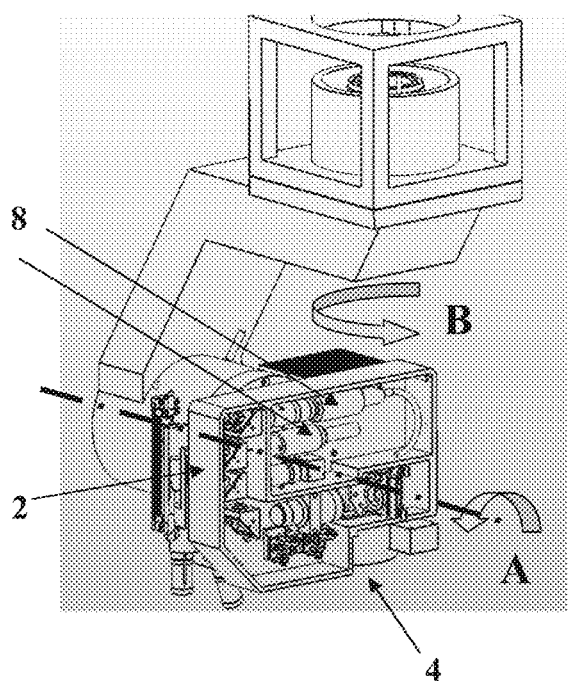

The FIGS. 2 and 3 illustrate the laser machine tool according to the invention.

FIG. 2 illustrates an example of a 5-axis gantry laser machine tool equipped with a moveable laser head according to the invention. The dual laser head 4 displayed can move on three linear axes X, Y, Z and on two rotary axes A, B. A workpiece (not visible) can be clamped on the table resp. workpiece-holder 7 within the laser machine tool. The displayed laser machine tool contains an integrated vacuum cleaner 3 to collect the fumes and dust around the laser head and a switch box integrated on the Z-axis. The machine has an opening to allow the loading of bulky workpieces, which can be closed for instance by a sliding door. The machine can further be equipped with a fume and dust suction hood 6 at the bottom of the machine. A table resp. workpiece-holder 7 with for instance a threads holes matrix is intended for fixing the workpiece. The holder 7 can for instance be allocated directly on the ground. Preferably, the machine is equipped, on all axes, with linear and rotary absolute encoders, which avoids having to reset the origins after a power outage.

FIG. 3 illustrates a possible configuration for the inventive dual laser head 4. The A-axis rotates around a horizontal axis parallel to the Y-axis. The B-axis is concentric to the Z-axis. Each axis is controlled preferably by a "Direct Drive" servomotor.

The dual head includes a large number of functions integrated in one compact block. It is packed with components and energy transmission systems (mechanical, optical, electronic, electrical or compressed air) in a small footprint. All optics and the galvanometric head 2 are placed preferably in a pressurized compartment, called "white zone", to ensure a good working life of the optics. Lasers and electrical components are placed in a so-called "grey" zone protected from dust. The dual laser head 4 incorporates in its housing two separate laser sources 8, whereby each laser source emits a different type of laser beams. The first type of laser beams emitted by the first laser source are suitable for drilling operations. The second type of laser beams emitted by the second laser source is suitable for engraving operations on the workpiece. The two laser sources mounted in the dual laser head cannot operate simultaneously. In a further embodiment of the invention it is foreseen to design the laser head with more than two laser sources.

Figure 4:
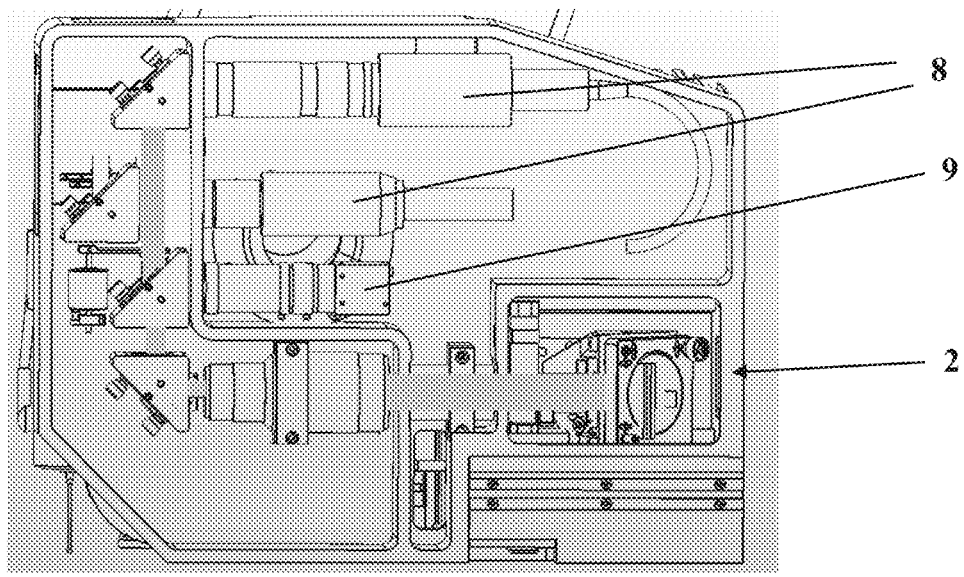
FIGS. 4 through 6 illustrate an embodiment of dual laser head in accordance with the present invention.
Figure 5:
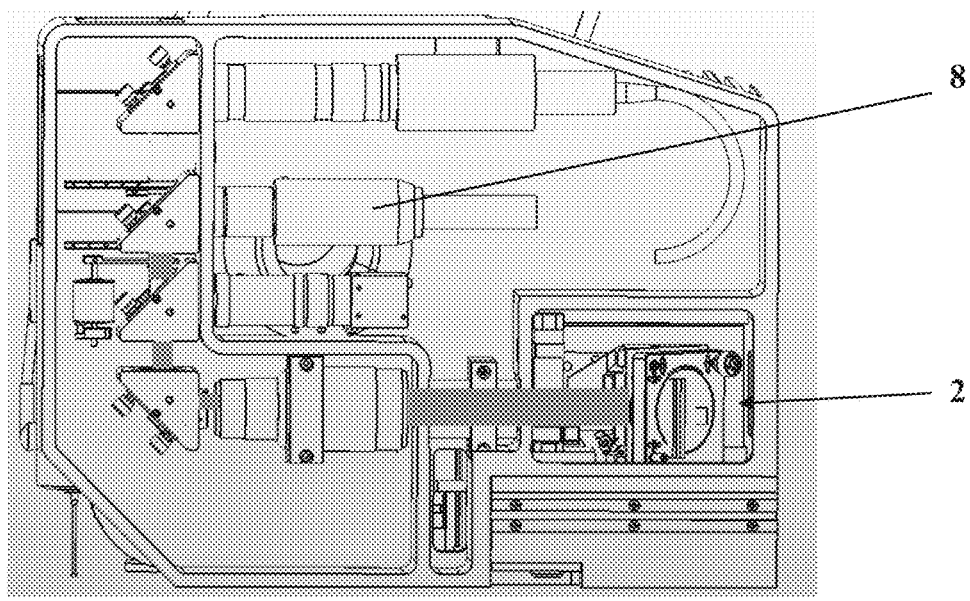
Figure 6:
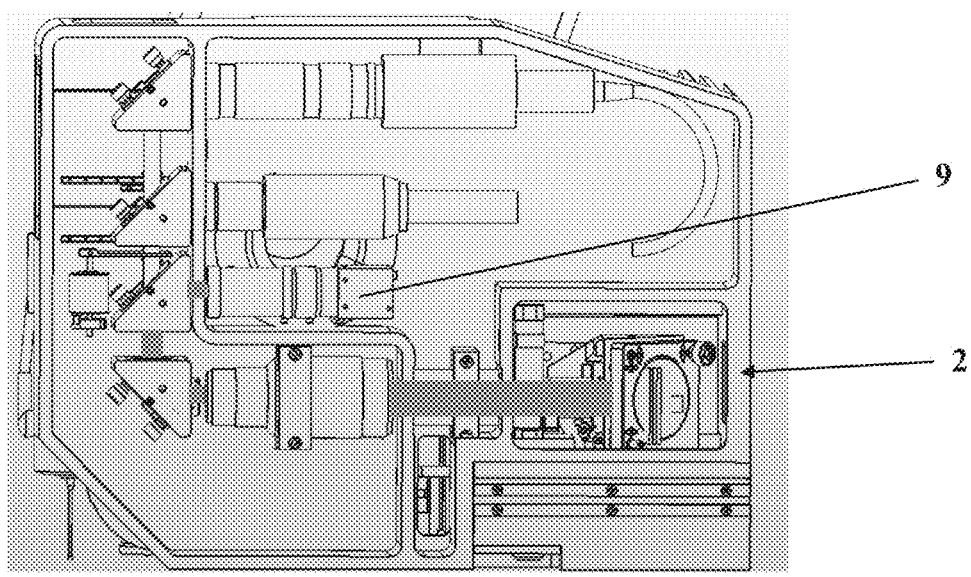

The FIGS. 4, 5 and 6 illustrate a possible embodiment of the invention, showing the dual laser head in later view. Visible are the two different laser sources 8, a camera 9 and the galvanometer 2. The upper laser source 8 is an engraving laser. Further visible is in FIG. 4 the path of the laser beams from the laser source to the input of the galvanometric head 2. In FIG. 5, the second, under laser source 8 is working. This second laser source is intended for several other purposes, particularly for drilling, or welding, or cutting or for a post-engraving treatment (e.g. heat treatment) of the workpiece. In FIG. 6 the camera 9 is active and uses the galvanometer 2 installed in the laser head for the image acquisition.

The camera 9 can be used for several purposes. E.g. for a position resetting, such as centring an engraving around an existing hole or engraving in the centre of a groove (e.g. vents in glass moulds). Or it can be used for the analysis of the laser beam return (with an infrared/visible separation optic or with an diode instead respectively in combination with a camera). A further, possible application can be the automatic resetting on the Z-axis, by analysing the position of two triangulated laser beam.

The first laser source producing the first type of laser beams emits laser pulses of 1500 W intensity for a duration of a single pulse of 20 ms up to a frequency of 1000 Hz up to CW (Continuous Waves) and is intended for drilling operations, for post-engraving treatment, micro drilling, micro welding, micro cuts or heat treatment for the local hardening of the workpiece of the dual laser head.

The second laser source producing the second type of laser beams emits laser pulses of 20 W to a maximum of 250 W intensity, preferably 50 W or 100 W. That laser source is intended for engraving operations.

Other Fiber Laser sources can be applied for cutting, welding, heat treatments from 1000 to 2000 W.

Obviously, the machine can be used just for milling or for engraving purposes of a workpiece.

The laser head contains one galvanometer through which the laser beams of both laser sources are directed to the workpiece to be machined.

The invention claimed is:

1. A 5 axis laser machine tool, for the machining of a workpiece by laser ablation comprising:
a moveable laser head for the emission of laser beams, wherein the movable laser head is incorporated in a housing and comprises two or more laser sources, whereby each laser source emits a different type of laser beams and whereby the two or more laser sources are incorporated in the laser head and cannot operate simultaneously for the machining of the workpiece.

2. A laser machine tool according to claim 1, wherein a first type of laser beams emitted by a first laser source is suitable for drilling operation on the workpiece, and a second type of laser beams emitted by a second laser source is suitable for engraving on the workpiece.

3. A laser machine tool according to claim 2, wherein the first laser source producing the first type of laser beams emits laser pulses of 1500 W intensity for a duration of a single pulse of 20 ms and a frequency in the range of 1000 Hz up to continuous waves.

4. A laser machine tool according to claim 3, wherein the second laser source producing the second type of laser beams emits laser pulses of 20 W to 250 W intensity.

5. A laser machine tool according to claim 3, wherein the second laser source producing the second type of laser beams emits laser pulses of 50 W to 100 W intensity.

6. A laser machine tool according to claim 3, wherein the first type of laser beams is intended for post-engraving treatment, and comprises one of micro drilling, micro welding, micro cuts and heat treatment for local hardening of the workpiece.

7. A laser machine tool according to claim 1, wherein the laser head contains one galvanometer through which the laser beams of both laser sources are directed to the workpiece to be machined.

8. A laser machine tool according to claim 7, wherein the laser head contains a camera which uses the galvanometer of the laser head for the image acquisition.

9. A laser machine tool according to claim 8, wherein the camera is a thermal camera.

10. A laser machine tool according to claim 7, wherein the laser head contains one of a diode and photo sensor which uses the galvanometer installed in the laser head for its signal acquisition and for gauging power of the laser sources by measuring intensity of the laser beams reflected by a surface of the workpiece.

11. A laser machine tool according to claim 1, including a process monitoring camera of the IP-type for acquiring an image of an entire working area situated within the laser machine tool.

* * * * *